United States Patent
Reinders

(10) Patent No.: US 11,163,585 B2
(45) Date of Patent: Nov. 2, 2021

(54) POST HOC IMAGE AND VOLUME REVIEW OF SHORT-LIVED LINUX CONTAINERS

(71) Applicant: Google LLC, Mountain View, CA (US)

(72) Inventor: Richard Reinders, Boulder Creek, CA (US)

(73) Assignee: Google LLC, Mountain View, CA (US)

( * ) Notice: Subject to any disclaimer, the term of this patent is extended or adjusted under 35 U.S.C. 154(b) by 169 days.

(21) Appl. No.: 16/687,636

(22) Filed: Nov. 18, 2019

(65) Prior Publication Data

US 2021/0149685 A1    May 20, 2021

(51) Int. Cl.
*G06F 9/445*    (2018.01)

(52) U.S. Cl.
CPC .............................. *G06F 9/44505* (2013.01)

(58) Field of Classification Search
CPC .................................................. G06F 9/44505
See application file for complete search history.

(56) References Cited

U.S. PATENT DOCUMENTS

| | | | |
|---|---|---|---|
| 9,524,389 B1 | 12/2016 | Roth | |
| 2014/0137112 A1* | 5/2014 | Rigolet | G06F 9/5022 718/1 |
| 2015/0373096 A1* | 12/2015 | Chandrasekaran | H04L 67/1014 709/226 |
| 2017/0242725 A1 | 8/2017 | Roth | |
| 2019/0042320 A1 | 2/2019 | Prince et al. | |

OTHER PUBLICATIONS

International Search Report, PCT/US2020/060926, dated Mar. 11, 2021, 14 pages.

* cited by examiner

*Primary Examiner* — Charlie Sun
(74) *Attorney, Agent, or Firm* — Honigman LLP; Brett A. Krueger

(57) ABSTRACT

Embodiments of the present invention provide a method, system and computer program product for post-hoc image review method for short-lived Linux containers. In an embodiment of the invention, a post-hoc image review method for short-lived Linux containers includes first directing a creation of a short-lived Linux container in a container management system and applying an initial configuration to the short-lived Linux container. Thereafter, the method includes detecting a termination of the short-lived Linux container. Finally, in response to the termination, the method includes snapshotting a configuration of the short-lived Linux container, comparing the initial configuration to the snapshotted configuration and displaying a list of differences in a container management display.

18 Claims, 2 Drawing Sheets

POST HOC IMAGE AND VOLUME REVIEW OF SHORT-LIVED LINUX CONTAINERS

BACKGROUND OF THE INVENTION

Field of the Invention

The present invention relates to the management of short-lived Linux containers and more particularly to the management of the application of a configuration to a short-lived Linux container.

Description of the Related Art

Conventionally, computer programs execute within an operating system environment on the bare metal of a computer with the operating system processing the program instructions of the computer program and providing moderated access to the resources of the computer. In the modern era of computing, however, the execution of multiple different programs within the same computer has become an essential requirement. To that end, virtualization is a technology that permits the execution of different computer program instances in different isolated virtual machines, known as "guests" and managed by a supervising process, known as a "hypervisor". Each virtual machine is isolated from each other virtual machine such that each instance of a computer program executing within a corresponding virtual machine remains completely isolated from other instances of the same program or other programs.

The use of virtualization, however, is not without consequence. Each virtual machine, as a guest operating system, must in of itself, support the operation of an operating system able to host the execution of a corresponding computer program instance. As will be understood, multiple different operating systems executing within corresponding virtual machines in a single computing system can consume substantial resources of the computing system thus affecting the performance of all host applications in their respective virtual machines.

To address the excess resource consumption of virtualization, containerization oftentimes is employed as a suitable substitute—especially where multiple instances of a single computer program are to be deployed within the same host computing system. Unlike virtualization, in containerization, no separate operating system is deployed in each container. Thus, containerization demands less resource consumption and thus higher operational performance for all instance of a computer program executing in a containerized host computing system. Even still, like a virtualized environment, in a containerized environment, each container must be configured with respect to the underlying resources of the host computing system such as permitted memory utilization, processor utilization, persistent storage, access control and the like.

Whether in a virtualized environment or a containerized environment, managing the configuration of multiple containers within multiple containerized computing systems presents an enormous challenge. In order to manage a coordinated configuration of a containerized host environment, standardized methods of defining different configurations have been developed so that a container may be configured simply in reference to a configuration definition and so that a configuration of a container may be expressed as a definition. But, knowing how to configure a container and whether or not a deviation from a configuration of a container is permissible requires manual intervention. In the context of single or even a handful of containers, so much is manageable. But, in the case of dozens, hundreds or thousands of containers, manual management of configuration changes in different containers is all but impossible.

BRIEF SUMMARY OF THE INVENTION

Embodiments of the present invention address deficiencies of the art in respect to container configuration management and provide a novel and non-obvious method, system and computer program product for post-hoc image review method for short-lived Linux containers. In an embodiment of the invention, a post-hoc image review method for short-lived Linux containers includes first directing a creation of a short-lived Linux container in a container management system and applying an initial configuration to the short-lived Linux container. Thereafter, the method includes detecting a termination of the short-lived Linux container. Finally, in response to the termination, the method includes snapshotting a configuration of the short-lived Linux container, comparing the initial configuration to the snapshotted configuration and displaying a list of differences in a container management display.

In one aspect of the embodiment, the snapshotted configuration is a list of files present in the short-lived Linux container contemporaneous with the termination, and the initial configuration is a list of files to be present in the short-lived Linux container contemporaneous with a creation of the short-lived Linux container. To that end, the comparison may be a comparison of data corresponding to the list of files present in the short-lived Linux container contemporaneous with the termination, and comparable data corresponding to the list of files present in the short-lived Linux container contemporaneous with the creation of the short-lived Linux container.

In another aspect of the embodiment, the short-lived Linux container is created in reference to an image of a different short-lived Linux container. In yet another aspect of the embodiment, the method additionally includes associating each of the differences in the list with a corresponding configuration change from the initial configuration, prompting in the display to whitelist each configuration change for each of the differences and adding to a white list, each selected one of the differences as a permissible configuration change. Relatedly, in yet another aspect of the embodiment, the method additionally includes associating each of the differences in the list with a corresponding configuration change from the initial configuration, prompting in the display to blacklist each configuration change for each of the differences and adding to a black list, each selected one of the differences as an impermissible configuration change.

In another embodiment of the invention, a short-lived Linux container management data processing system is configured for post-hoc image review method for short-lived Linux containers. The system includes a host computing platform that has one or more computers, each with memory and at least one processor. The system also includes a post-hoc image review module executing in the memory of the host computing platform and communicatively coupled to a short-lived Linux container manager that manages creation, execution and termination of different short-lived Linux containers. The module includes computer program instructions enabled during execution in the host computing platform to direct the short-lived Linux container manager to create a short-lived Linux container in a container management system and to apply an initial configuration to the short-lived Linux container, to detect a termination of the short-lived Linux container by the short-lived Linux container manager and to respond to the termination by directing the short-lived Linux container manager to snapshot a configuration of the short-lived Linux container, comparing the initial configuration to the snapshotted configuration and displaying a list of differences in a container management display of the module.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for post-hoc image review method for short-lived Linux containers. In accordance with an embodiment of the invention, a short-lived Linux container is created in a container management system and configured in accordance with a specified configuration. The configuration applied to the created container is then stored in a file. Once created, different applications are launched for execution with the created container. Thereafter, the execution of the container is monitored so as to detect a directive by the container management system to terminate the container. In response to detecting the directive to terminate the container, a configuration of the container at the time of termination is recorded and compared to the configuration in the stored file. To the extent that a discrepancy is detected between the configurations, a prompt is generated in connection with the container management system to white list, black list or take no action in respect to each configuration discrepancy. In this way, configuration changes within the short-lived container are readily identified for analysis and feedback in the container management system despite the short-lived nature of the container.

Figure 1:
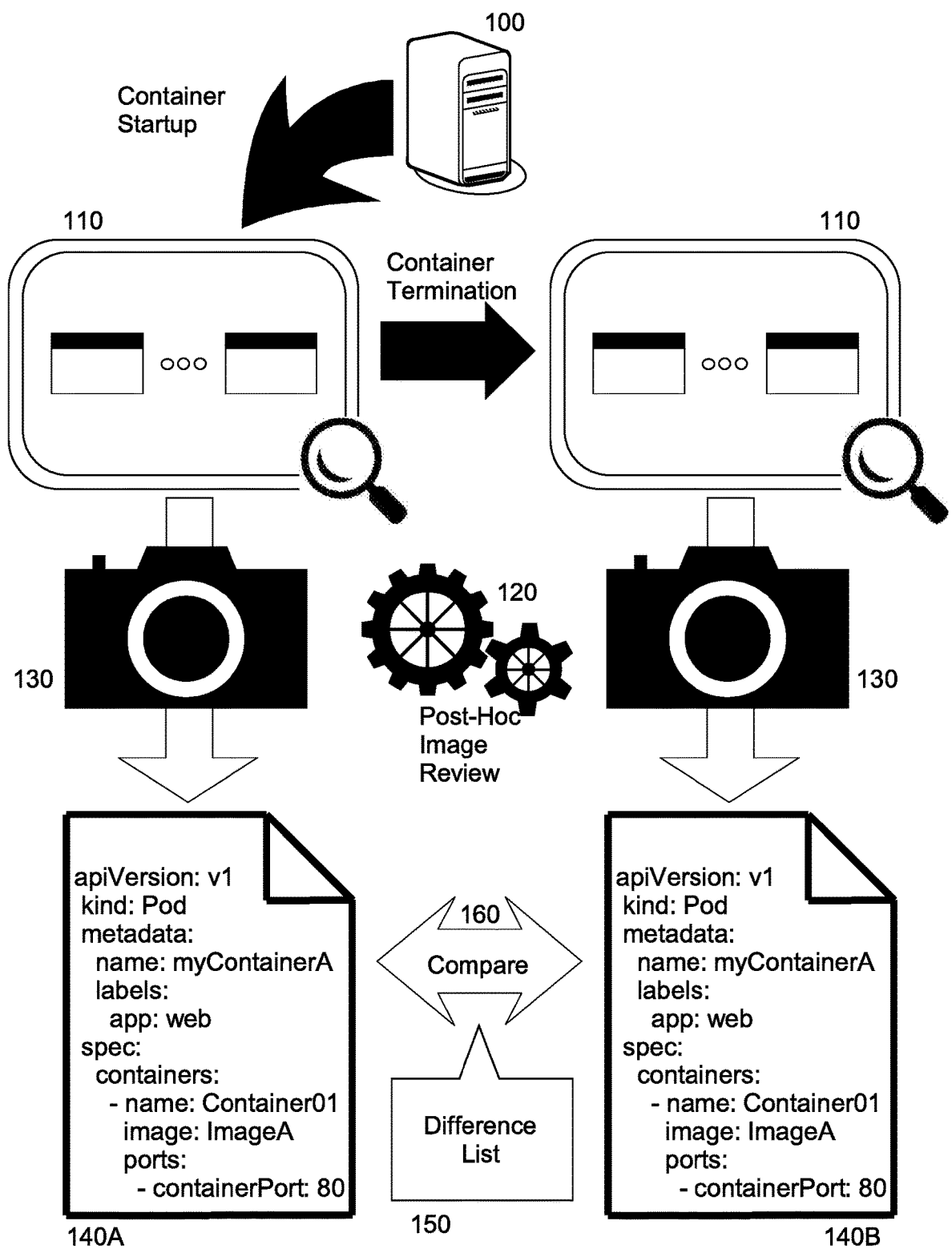
FIG. 1 is pictorial illustration of a process for post-hoc image review method for short-lived Linux containers.

In further illustration, FIG. 1 pictorially shows a process for post-hoc image review method for short-lived Linux containers. As shown in FIG. 1, a short-lived container 110 is created for use in a server environment by a container management system 100. A snapshot 130 is acquired of the container 110 so as to produce a recorded configuration 140A of the created container 110. In this regard, the recorded configuration 140A can include a list of files included as part of the configuration of the container 110, or data corresponding to the list of files included as part of the configuration of the container 110 at the time of creation of the container 110.

Thereafter, post-hoc image review logic 120 detects a termination of the container 110 and acquires a snapshot 130 of the container 110 at the time of termination. Once again, the snapshot 130 produces a recorded configuration 140B of the now terminated container 110. A comparison 160 is then performed of the recorded configuration 140A and the recorded configuration 140B so as to produce a difference list 150. A prompt is then generated in a user interface to the container management system 100 that includes a presentation of the content of the difference list 150 and invites a white-listing of differing configuration changes evident in the difference list 150, a black-listing of differing configuration changes evident in the difference list 150, or an ignoring of differing configuration changes evident in the difference list 150.

Figure 2:
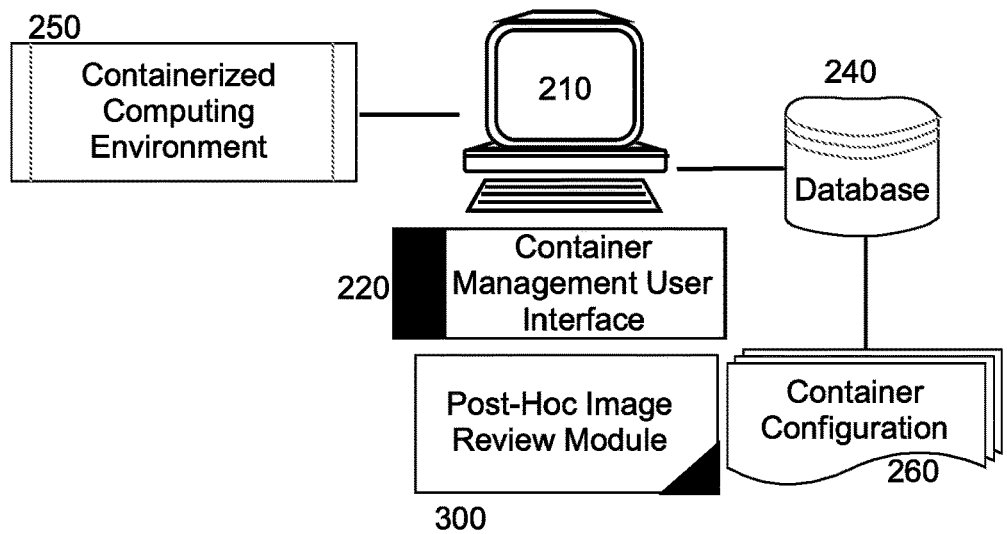
FIG. 2 is a schematic illustration of a container management data processing system configured for post-hoc image review method for short-lived Linux containers; and, FIG. 3 is a flow chart illustrating a process for post-hoc image review method for short-lived Linux containers.

The process described in connection with FIG. 1 may be implemented within a computer data processing system. In further illustration, FIG. 2 schematically shows a container management data processing system configured for post-hoc image review method for short-lived Linux containers. The system includes a host computing platform 210 that includes one or more computers, each with memory and at least one processor. A containerized computing environment 250 is defined and management within the host computing platform by way of a container management user interface 220 in which different containers—short-lived Linux containers—are configured for operation within the host computing platform 210, each able to support the execution therein of different computer programs, and each including a different corresponding configuration.

Of note, a post-hoc image review module 300 executes in the memory of the host computing platform 210 and is coupled to the container management user interface 220. The post-hoc image review module 300 includes computer program instructions that when executed by one or more of the processors in the memory of the host computing platform 210, is enabled to monitor creation of different containers in the containerized computing environment 250 and to record in database 240, for each of the containers, a corresponding configuration 260 at the time of creation of a respective one of the containers. The program instructions additionally are enabled to detect a termination of each of the containers and in response, to compare a configuration of each terminated one of the containers with a recorded configuration for the terminated container. The program instructions yet further are enabled to identify from the comparison, one or more discrepancies and to present the discrepancies in the container management user interface 220.

Optionally, the program instructions are enabled to receive a selection for white-listing or black-listing each one of the discrepancies. In the former instance, a subsequent detection of a configuration discrepancy that has been white-listed will not appear in the prompt as a discrepancy. In the latter instance, the container management user interface 220 upon encountering an attempt to apply a configuration change associated with the black-listed configuration discrepancy, will disallow the attempt to apply the configuration change.

Figure 3:
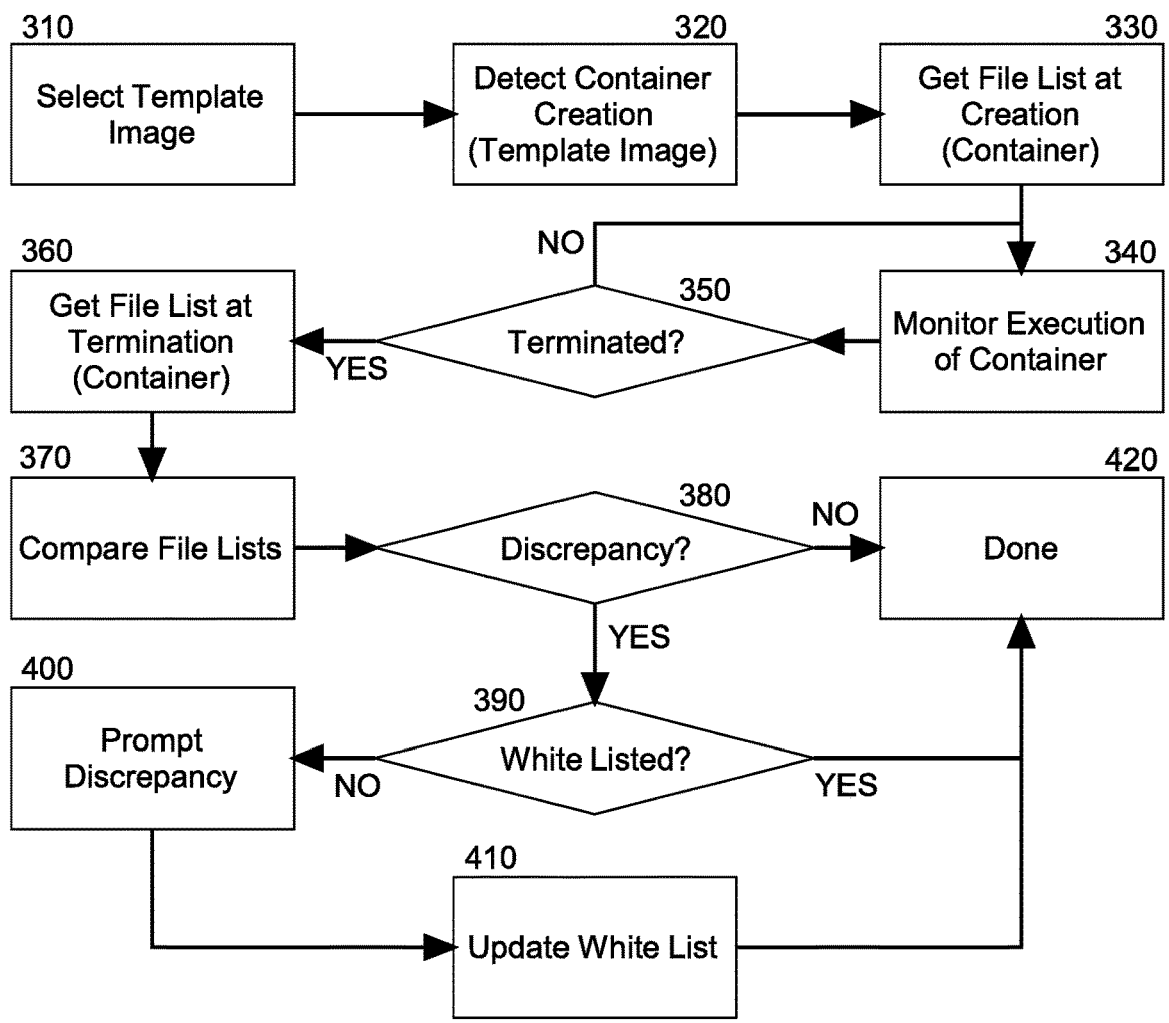

In even yet further illustration of the operation of the post-hoc image review module, FIG. 3 is a flow chart illustrating a process for post-hoc image review method for short-lived Linux containers. Beginning in block 310, a templated image, for instance an existing container, is selected in the container management user interface as a basis for creating a new container, by copying a configuration of the existing container and applying the configuration to the new container. In block 320, the creation of the container is detected and in response, in block 330, a file list for created container is retrieved. Thereafter, in block 340, the execution of the container is monitored in order to detect a directive to terminate the operation of the container.

In decision block 350, it is determined whether or not a directive is received for the termination of the container. If so, in block 360, a file list for the container at the time of termination is retrieved. Then, in block 370 the file list for the container at the time of termination is compared to the file list retrieved at the time of the creation of the container. In this regard, the comparison is made on the basis of any combination of file name, file size, hash value of file name and/or file size, file date of creation or file date of modification to name a few examples. In decision block 380, it is determined if any discrepancies exist between the lists. If so, in decision block 390 it is further determined if any detected discrepancies are present in a white-list of configuration changes associated with the discrepancies. If not, then in block 400, a prompt is displayed for the non white-listed discrepancies and a selection is received to either ignore, black-list or white-list each of the discrepancies in the prompt. Based upon the selections, in block 410, the white-list is then updated and the process ends in block 420.

Of note, the foregoing process is shown to occur in response to the detection of a termination of a short-lived Linux container. However, as a variation of the foregoing, the foregoing response may also occur prior to termination of the container in response to a determination that the execution performance of applications within the container, or the container itself, has fallen below a threshold performance level so as to warrant the termination of the container. Examples include a detection of a threshold minimum amount of memory available or a maximum amount of processor cycles consumed. In this way, the observation of configuration discrepancies can be used to determine a root cause of the observed performance degradation of the container.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A post-hoc image review method for short-lived Linux containers, the method comprising:
   directing a creation of a short-lived Linux container in a container management system;
   applying an initial configuration to the short-lived Linux container;
   detecting a termination of the short-lived Linux container; and,
   responsive to the termination, snapshotting a configuration of the short-lived Linux container, comparing the initial configuration to the snapshotted configuration and displaying a list of differences in a container management display.

2. The method of claim 1, wherein the snapshotted configuration is a list of files present in the short-lived Linux container contemporaneous with the termination, and the initial configuration is a list of files to be present in the short-lived Linux container contemporaneous with a creation of the short-lived Linux container.

3. The method of claim 1, wherein the short-lived Linux container is created in reference to an image of a different short-lived Linux container.

4. The method of claim 2, wherein the comparison is a comparison of data corresponding to the list of files present in the short-lived Linux container contemporaneous with the termination, and comparable data corresponding to the list of files present in the short-lived Linux container contemporaneous with the creation of the short-lived Linux container.

5. The method of claim 1, further comprising:
   associating each of the differences in the list with a corresponding configuration change from the initial configuration;
   prompting in the display to whitelist each configuration change for each of the differences; and,
   adding to a white list, each selected one of the differences as a permissible configuration change.

6. The method of claim 1, further comprising:
   associating each of the differences in the list with a corresponding configuration change from the initial configuration;
   prompting in the display to blacklist each configuration change for each of the differences; and,
   adding to a black list, each selected one of the differences as an impermissible configuration change.

7. A short-lived Linux container management data processing system configured for post-hoc image review method for short-lived Linux containers, the system comprising:
   a host computing platform comprising one or more computers, each with memory and at least one processor;
   a post-hoc image review module executing in the memory of the host computing platform and communicatively coupled to a short-lived Linux container manager managing creation, execution and termination of different short-lived Linux containers, the module comprising computer program instructions enabled to perform:
      directing the short-lived Linux container manager to create a short-lived Linux container in a container management system and to apply an initial configuration to the short-lived Linux container;
      detecting a termination of the short-lived Linux container by the short-lived Linux container manager; and,
      to respond to the termination by directing the short-lived Linux container manager to snapshot a configuration of the short-lived Linux container, comparing the initial configuration to the snapshotted configuration and displaying a list of differences in a container management display of the module.

8. The system of claim 7, wherein the snapshotted configuration is a list of files present in the short-lived Linux container contemporaneous with the termination, and the initial configuration is a list of files to be present in the short-lived Linux container contemporaneous with a creation of the short-lived Linux container.

9. The system of claim 7, wherein the short-lived Linux container is created in reference to an image of a different short-lived Linux container.

10. The system of claim 8, wherein the comparison is a comparison of data corresponding to the list of files present in the short-lived Linux container contemporaneous with the termination, and comparable data corresponding to the list of files present in the short-lived Linux container contemporaneous with the creation of the short-lived Linux container.

11. The system of claim 7, wherein the program instructions are further enabled to perform:
   associating each of the differences in the list with a corresponding configuration change from the initial configuration;
   prompting in the display to whitelist each configuration change for each of the differences; and,
   adding to a white list, each selected one of the differences as a permissible configuration change.

12. The system of claim 7, wherein the program instructions are further enabled to perform:
   associating each of the differences in the list with a corresponding configuration change from the initial configuration;
   prompting in the display to blacklist each configuration change for each of the differences; and,
   adding to a black list, each selected one of the differences as an impermissible configuration change.

13. A computer program product for post-hoc image review method for short-lived Linux containers, the computer program product including a computer readable storage medium having program instructions embodied therewith, the program instructions executable by a device to cause the device to perform a method including:
   directing a creation of a short-lived Linux container in a container management system;
   applying an initial configuration to the short-lived Linux container;
   detecting a termination of the short-lived Linux container; and, responsive to the termination, snapshotting a configuration of the short-lived Linux container, comparing the initial configuration to the snapshotted configuration and displaying a list of differences in a container management display.

14. The computer program product of claim 13, wherein the snapshotted configuration is a list of files present in the short-lived Linux container contemporaneous with the termination, and the initial configuration is a list of files to be present in the short-lived Linux container contemporaneous with a creation of the short-lived Linux container.

15. The computer program product of claim 13, wherein the short-lived Linux container is created in reference to an image of a different short-lived Linux container.

16. The computer program product of claim 14, wherein the comparison is a comparison of data corresponding to the list of files present in the short-lived Linux container contemporaneous with the termination, and comparable data corresponding to the list of files present in the short-lived Linux container contemporaneous with the creation of the short-lived Linux container.

17. The computer program product of claim 13, wherein the method further comprises:
- associating each of the differences in the list with a corresponding configuration change from the initial configuration;
- prompting in the display to whitelist each configuration change for each of the differences; and,
- adding to a white list, each selected one of the differences as a permissible configuration change.

18. The computer program product of claim 13, wherein the method further comprises:
- associating each of the differences in the list with a corresponding configuration change from the initial configuration;
- prompting in the display to blacklist each configuration change for each of the differences; and,
- adding to a black list, each selected one of the differences as an impermissible configuration change.

* * * * *